US010628687B1

United States Patent
Krekel et al.

(10) Patent No.: US 10,628,687 B1
(45) Date of Patent: Apr. 21, 2020

(54) PARKING SPOT IDENTIFICATION FOR VEHICLE PARK-ASSIST

(71) Applicant: Ford Global Technologies, LLC, Dearborn, MI (US)

(72) Inventors: Markus Krekel, Wermelskirchen (DE); Cinderella Matuk, Cologne (DE); Ahmed Benmimoun, Aachen (DE); Lars Kuhnert, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/159,300

(22) Filed: Oct. 12, 2018

(51) Int. Cl.
| G06K 9/00 | (2006.01) |
| B60W 30/06 | (2006.01) |
| B60W 40/107 | (2012.01) |
| G05D 1/02 | (2020.01) |
| G05D 1/00 | (2006.01) |

(52) U.S. Cl.
CPC ......... *G06K 9/00812* (2013.01); *B60W 30/06* (2013.01); *B60W 40/107* (2013.01); *G05D 1/0088* (2013.01); *G05D 1/0278* (2013.01); *G05D 2201/0213* (2013.01)

(58) Field of Classification Search
CPC .............. G06K 9/00812; B60W 30/06; B60W 40/107; G05D 1/0088; G05D 1/0278; G05D 2201/0213
See application file for complete search history.

(56) References Cited

U.S. PATENT DOCUMENTS

| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |

(Continued)

FOREIGN PATENT DOCUMENTS

| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Quan-Zhen Wang
*Assistant Examiner* — Rajsheed O Black-Childress
(74) *Attorney, Agent, or Firm* — Frank Lollo; Eversheds Sutherland (US) LLP

(57) ABSTRACT

Method and apparatus are disclosed for parking spot identification for vehicle park-assist. An example vehicle includes range-detection sensors, an acceleration sensor, an autonomy unit to perform park-assist, and a controller. The controller is configured to determine, via the acceleration sensor, whether the vehicle is accelerating. The controller also is to, responsive to determining that the vehicle is not accelerating, identify potential parking spots for the park-assist via the range-detection sensors. The controller also is to, responsive to detecting that the vehicle is accelerating, suppress identification of the potential parking spots.

16 Claims, 7 Drawing Sheets

(56) References Cited

U.S. PATENT DOCUMENTS

| | | |
|---|---|---|
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne et al. |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis et al. |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |

(56) References Cited

U.S. PATENT DOCUMENTS

| | | |
|---|---|---|
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1* | 11/2012 | Pampus ............ B60W 30/0956 701/301 |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1* | 5/2014 | Allexi .................. B60W 50/10 701/70 |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |

(56) References Cited

U.S. PATENT DOCUMENTS

| | | |
|---|---|---|
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Lagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1* | 11/2018 | Kim ................. B60Q 9/002 |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Automatically Into the Parking Space—https://www.mercedes-benz.com/en/mercedes-benz/next/automation/automatically-into-the-parking-space/; Oct. 27, 2014.

Bill Howard, Bosch's View of the Future Car: Truly Keyless Entry, Haptic Feedback, Smart Parking, Cybersecurity, Jan. 9, 2017, 8 Pages.

ChargeItSpot Locations, Find a Phone Charging Station Near You, retrieved at https://chargeitspot.com/locations/ on Nov. 28, 2017.

(56) References Cited

OTHER PUBLICATIONS

Core System Requirements Specification (SyRS), Jun. 30, 2011, Research and Innovative Technology Administration.
Daimler AG, Remote Parking Pilot, Mar. 2016 (3 Pages).
Land Rover, Land Rover Remote Control Via iPhone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.
Land Rover develops a smartphone remote control for its SUVs, James Vincent, Jun. 18, 2015.
Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, IParking: An Intelligent Indoor Location-Based Smartphone Parking Service, Oct. 31, 2012, 15 pages.

\* cited by examiner

PARKING SPOT IDENTIFICATION FOR VEHICLE PARK-ASSIST

TECHNICAL FIELD

The present disclosure generally relates to park-assist and, more specifically, to parking spot identification for vehicle park-assist.

BACKGROUND

Oftentimes, vehicles include autonomous or semi-autonomous driving systems that enable the vehicles to be driven with reduced driver input. Typically, a vehicle with an autonomous or semi-autonomous driving system includes sensors that collect information of a surrounding environment of the vehicle. In such instances, the autonomous or semi-autonomous driving system performs motive functions (e.g., steering, accelerating, braking, etc.) based on the collected information. Some driving systems utilize information collected from sensors to autonomously or semi-autonomously park a vehicle into an identified parking spot (e.g., a parallel parking spot, a perpendicular parking spot, an angled parking spot).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for parking spot identification for vehicle park-assist. An example disclosed vehicle includes range-detection sensors, an acceleration sensor, an autonomy unit to perform park-assist, and a controller. The controller is configured to determine, via the acceleration sensor, whether the vehicle is accelerating. The controller also is to, responsive to determining that the vehicle is not accelerating, identify potential parking spots for the park-assist via the range-detection sensors. The controller also is to, responsive to detecting that the vehicle is accelerating, suppress identification of the potential parking spots.

In some examples, the acceleration sensor includes a vehicle speed sensor. In some examples, the acceleration sensor includes an accelerator pedal position sensor.

Some examples further include a display to present a representation of a parking spot identified by the controller. In some such examples, the autonomy unit is to perform the park-assist to park the vehicle in the parking spot identified by the controller.

In some examples, the controller is to suppress the identification of the potential parking spots responsive to determining, via the range-detection sensors, that the vehicle is passing or being passed by another vehicle.

In some examples, when the vehicle is in one of a plurality of lanes designated for a same direction-of-travel, the controller is to suppress the identification of potential parallel parking spots along a side of the vehicle while detecting one or more of the plurality of lanes on the side of the vehicle.

Some examples further include a GPS receiver to identify a vehicle location. In such examples, the controller is to determine whether to suppress the identification of the potential parking spots based on the vehicle location. Some such examples further include a communication module to retrieve parking information for the vehicle location. In such examples, the controller is to determine whether to suppress the identification of the potential parking spots for the vehicle location based on the parking information.

In some examples, the controller is to suppress the identification of a potential perpendicular parking spot in front of the vehicle responsive to detecting that the vehicle is located on a road. In some such examples, the controller is to suppress the identification of the potential perpendicular parking spot for remote park-assist.

Some examples further include a steering angle sensor. In such examples, the controller is to suppress the identification of a potential perpendicular parking spot in front of the vehicle upon determining, via the steering angle sensor and the range-detection sensors, that the vehicle is turning away from the potential perpendicular parking spot. In some such examples, the controller is to suppress the identification of the potential perpendicular parking spot based on the steering wheel angle sensor in response to detecting that the vehicle is at least one of within a parking lot and approaching a bend in a road.

In some examples, the controller is to override suppressing the identification of the potential parking spots responsive to determining that a current driving pattern of the vehicle corresponds with a parking lot.

An example disclosed method includes determining whether a vehicle is accelerating via an acceleration sensor. The example disclosed method also includes identifying, via a processor and range-detection sensors, potential parking spots for a park-assist system of the vehicle responsive to determining that the vehicle is not accelerating. The examples disclosed method also includes suppressing, via the processor, identification of the potential parking spots responsive to detecting that the vehicle is accelerating.

An example disclosed vehicle includes range-detection sensors, a human-machine interface (HMI) unit including a display, and a controller. The controller is configured to identify a potential parking spot via the range-detection sensors. The controller also is configured to present, via the display, an interface depicting the potential parking spot and receive, via the HMI unit, a confirmation or a correction from an operator. The example disclosed vehicle also includes an autonomy unit to perform park-assist into the potential parking spot responsive to the controller receiving the confirmation.

In some examples, responsive to receiving the correction, the controller is to determine whether the correction corresponds with another potential parking spot. In some such examples, responsive to the controller determining that the correction corresponds with the other potential parking spot, the autonomy unit is to perform the park-assist into the other potential parking spot. Further, in some such examples, the controller is to store identification of the potential parking spot or the other potential parking spot in a parking map. Moreover, some such examples further include a communication module that is configured to transmit the parking map to a remote server.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
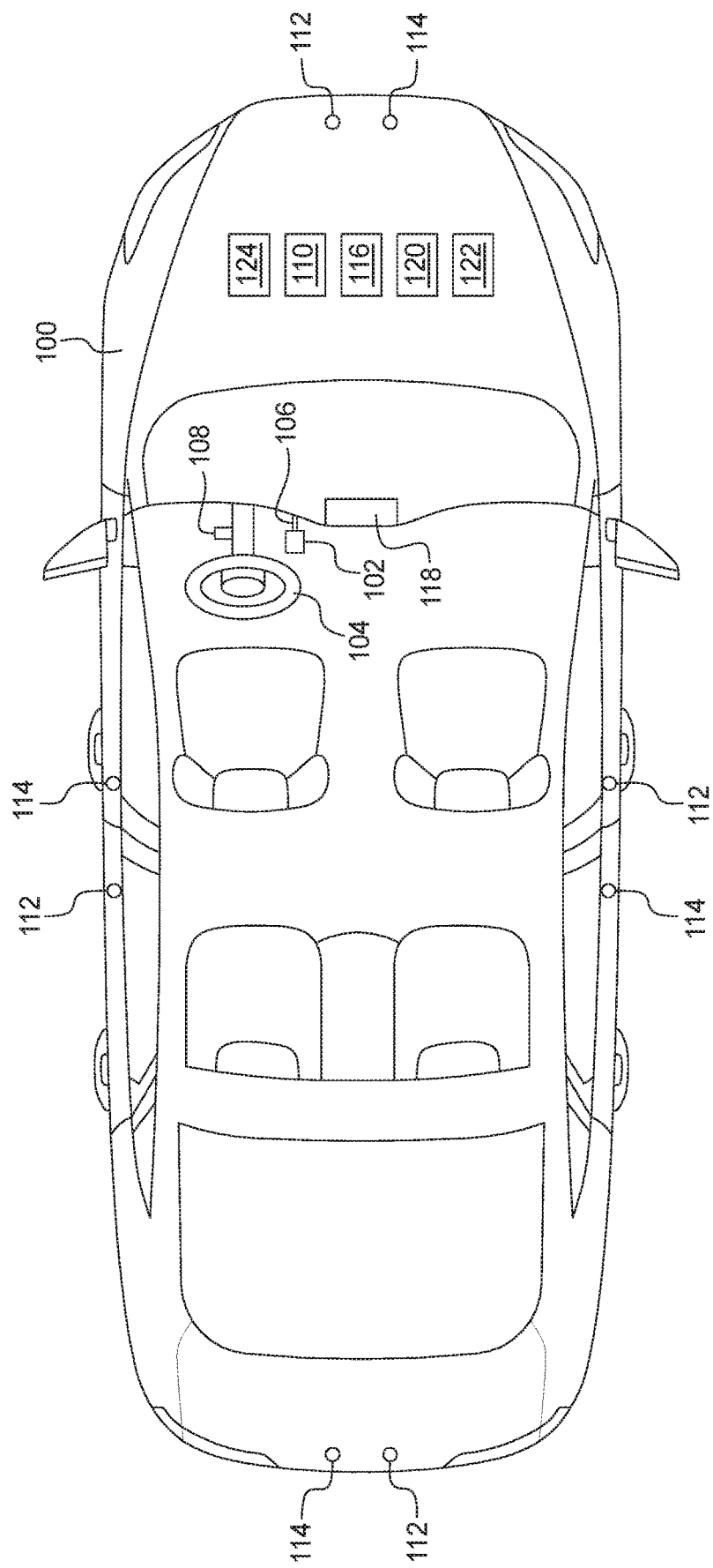
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include autonomous or semi-autonomous driving systems that enable the vehicles to be driven with reduced driver input. Typically, a vehicle with an autonomous or semi-autonomous driving system includes sensors that collect information of a surrounding environment of the vehicle. In such instances, the autonomous or semi-autonomous driving system performs motive functions (e.g., steering, accelerating, braking, etc.) based on the collected information. Some driving systems utilize information collected from sensors to autonomously or semi-autonomously park a vehicle into an identified parking spot (e.g., a parallel parking spot, a perpendicular parking spot, an angled parking spot).

Some autonomous parking systems of vehicles identify parking spots without prompting by operators (e.g., drivers) of the vehicles. In some such instances, an autonomous parking system potentially may identify an available parking spot where no parking spot is, in fact, present. In other words, some autonomous parking systems potentially may identify false positives for parking spots. For instance, some false positives potentially may be a result of vehicle sensors (e.g., ultrasonic sensors, radar sensors, lidar sensors, cameras) detecting a constant gap over time between two or more moving objects. Additionally or alternatively, an autonomous parking system potentially may fail to identify an available parking spot where a parking spot is, in fact, present. In other words, some autonomous parking systems potentially may identify false negatives for parking spots.

Example methods and apparatus disclosed herein include a vehicle park-assist system that deters false negatives and false positives when identifying potential available parking spots. Examples disclosed herein include a park-assist system that determines whether to search for available parking spots based on characteristics of a vehicle and/or characteristics of a surrounding environment of the vehicle. If the characteristics correspond with a parking event of the vehicle, the park-assist system enables identification of the potential available parking spots. If the characteristics do not correspond with a parking event of the vehicle, the park-assist system suppresses identification of the potential available parking spots to prevent false positives from being identified. In some examples, the park-assist system simultaneously (1) enables identification of the potential available parking spots in one direction (e.g., to the left) of the vehicle and (2) suppresses identification of the potential available parking spots in another direction (e.g., to the right) of the vehicle. Also, examples disclosed herein include an interface that enables an operator (e.g., a driver) of the vehicle to correct a parking spot identified by a park-assist system, thereby reducing the number of false negatives and false positives for available parking spots.

As used herein, "vehicle park-assist" and "park-assist" refer to a system in which a vehicle controls its motive functions without direct steering or velocity input from a driver to autonomously park within a parking spot. As used herein, "vehicle remote park-assist," "remote park-assist," "RePA," and "remote parking" refer to a system in which a vehicle controls its motive functions without direct steering or velocity input from a driver to autonomously park within a parking spot while the driver is located outside of the vehicle. For example, an autonomy unit of a remote park-assist system controls the motive functions of the vehicle upon receiving a remote initiation signal from a driver.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 includes a steering wheel 102 and an acceleration pedal 104. The steering wheel 102 enables an operator (e.g., a driver) to steer the vehicle 100 for non-autonomous and/or semi-autonomous motive functions. Further, the acceleration pedal 104 enables the vehicle 100 to accelerate the vehicle 100 for non-autonomous and/or semi-autonomous motive functions.

Further, the vehicle 100 of the illustrated example includes a steering wheel angle sensor 106, an acceleration pedal sensor 108, and a vehicle speed sensor 110. The steering wheel angle sensor 106 is configured to detect an angle of the steering wheel 102. For example, the steering wheel angle sensor 106 monitors the steering wheel 102 to detect whether, in which direction, and/or to what degree the operator is turning the steering wheel 102. The acceleration pedal sensor 108 is configured to detect a position and/or angle of the acceleration pedal 104. For example, the acceleration pedal sensor 108 monitors the acceleration pedal 104 to detect (i) whether the operator is engaging the acceleration pedal 104, (ii) to what degree the operator has actuated the acceleration pedal 104, and/or an (iii) acceleration of the vehicle 100 that corresponds with actuation of the acceleration pedal 104. Further, the vehicle speed sensor 110 detects a speed at which the vehicle 100 is travelling along a surface. In some examples, the vehicle speed sensor 110 is configured to detect an acceleration of the vehicle 100 by monitoring a speed of the vehicle 100 over a period of time.

That is, the vehicle 100 includes one or more acceleration sensors, such as the acceleration pedal sensor 108 and/or the vehicle speed sensor 110, that are configured to monitor an acceleration of the vehicle 100.

In the illustrated example, the vehicle 100 also includes range-detection sensors. For example, the range-detection sensors enable the vehicle 100 to perform autonomous and/or semi-autonomous driving maneuvers. As used herein, a "range-detection sensor" refers to an electronic device that is configured to collect information to detect a presence of and distance to nearby object(s). In the illustrated example, the range-detection sensors of the vehicle 100 include proximity sensors 112 and cameras 114. The proximity sensors 112 are configured to detect the presence, proximity, and/or location of object(s) near the vehicle 100. For example, the proximity sensors 112 include radar sensor(s), lidar sensor(s), ultrasonic sensor(s), and/or any other sensor configured to detect the presence, proximity, and/or location of nearby object(s). A radar sensor detects and locates an object via radio waves, a lidar sensor detects and locates the object via lasers, and an ultrasonic sensor detects and locates the object via ultrasound waves. Further, the cameras 114 capture image(s) and/or video of a surrounding area of the vehicle 100 to enable nearby object(s) to be identified and located. In the illustrated example, the range-detection sensors (e.g., the proximity sensors 112, the cameras 114) are located on each side of the vehicle 100 (e.g., front, rear, left, right) to enable the range-detection sensors in monitoring each portion of the surrounding area of the vehicle 100. In some examples, the measurements collected by the range-detection sensors over time are utilized to determine a velocity and/or an acceleration of the vehicle 100.

Further, the vehicle 100 of FIG. 1 includes a global positioning system (GPS) receiver 116 and a display 118. The GPS receiver 116 is configured to receive a signal from a global positioning system to identify a location of the vehicle 100. The display 118 is configured to present interface(s) and/or other output information to an occupant of the vehicle 100. For example, the display 118 is a center console display (e.g., a liquid crystal display (LCD), an organic light emitting diode (OLED) display, a flat panel display, a solid state display, etc.) and/or a heads-up display. In some examples, the display 118 is a touchscreen that is configured to collect input information from an occupant.

The vehicle 100 of the illustrated example also includes a communication module 120 that includes wired or wireless network interfaces to enable communication with other devices and/or external networks. The communication module 120 also includes hardware (e.g., processors, memory, storage, antenna, etc.) and software to control the wired or wireless network interfaces. For example, the communication module 120 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the communication module 120 includes a wireless personal area network (WPAN) module that is configured to wirelessly communicate with a mobile device (e.g., a key fob, a smart phone, a wearable, a smart watch, a tablet, etc.) of an operator and/or other occupant of the vehicle 100 via short-range wireless communication protocol(s). In some examples, the communication module 120 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 120 is configured to wirelessly communicate via Wi-Fi®, Near Field Communication (NFC), ultra-wide band (UWB) communication, ultra-high frequency (UHF) communication, low frequency (LF) communication, and/or any other communication protocol that enables the communication module 120 to communicatively couple to a mobile device.

In the illustrated example, the vehicle 100 includes an autonomy unit 122. For example, the autonomy unit 122 is an electronic control unit (e.g., one of a plurality of electronic control units 208 of FIG. 2). The autonomy unit 122 is configured to control performance of autonomous and/or semi-autonomous driving maneuvers of the vehicle 100 based upon, at least in part, data collected by the proximity sensors 112, the cameras 114, and/or other range-detection sensors of the vehicle 100. For example, the autonomy unit 122 performs autonomous and/or semi-autonomous driving maneuvers of the vehicle 100 for park-assist.

The vehicle 100 of FIG. 1 also includes a park-assist controller 124 that is configured to control operation of a park-assist system of the vehicle 100. For example, the park-assist controller 124 is configured to collect vehicle data of the vehicle 100. In some examples, the vehicle data includes a speed (e.g., collected via the vehicle speed sensor 110), an acceleration (e.g., collected via an acceleration sensor), a location (e.g., collected via the GPS receiver 116), a direction-of-travel (e.g., determined via the GPS receiver 116), a turn angle (e.g., collected via the steering wheel angle sensor 106), a driving pattern, etc. Further, the park-assist controller 124 is configured to collect data of a surrounding environment of the vehicle 100. In some examples, the environment data include proximity data (e.g., collected via the range-detection sensors) of nearby object(s) and/or location-classification information (e.g., collected via the range-detection sensors, a remote server, etc.). In some examples, the location-classification information identifies (i) a road along which the vehicle 100 is travelling, (ii) how many lanes the road includes, (iii) in which lane of the road the vehicle 100 is travelling, (iv) a width of the lane, (v) whether the road is bending (vi) whether the vehicle 100 is in a construction zone, (vii) whether the vehicle 100 is in a parking lot, (viii) whether the vehicle 100 is in a settlement area, etc.

Based on the collected vehicle data and/or data of the surrounding area, the park-assist controller 124 is configured to determine whether to suppress identification of potential parking spot(s). If the park-assist controller 124 determines to suppress identification of potential parking spot(s), the vehicle 100 does not monitor for potential parking spot(s) and/or present potential parking spot(s) to the operator. If the park-assist controller 124 determines to not suppress identification of potential parking spot(s), the vehicle 100 monitors for potential parking spot(s) based on data collected by the range-detection sensors. For example, if the park-assist controller 124 identifies a potential parking spot, the park-assist controller 124 presents, via the display 118, a representation of the potential parking spot. That is, the display 118 presents an interface depicting the potential parking spot to the operator. Additionally or alternatively, the park-assist controller 124 is configured to instruct the autonomy unit 122 to perform the park-assist motive functions to autonomously and/or semi-autonomously park the vehicle 100 in the parking spot identified by the park-assist controller 124.

Figure 2:
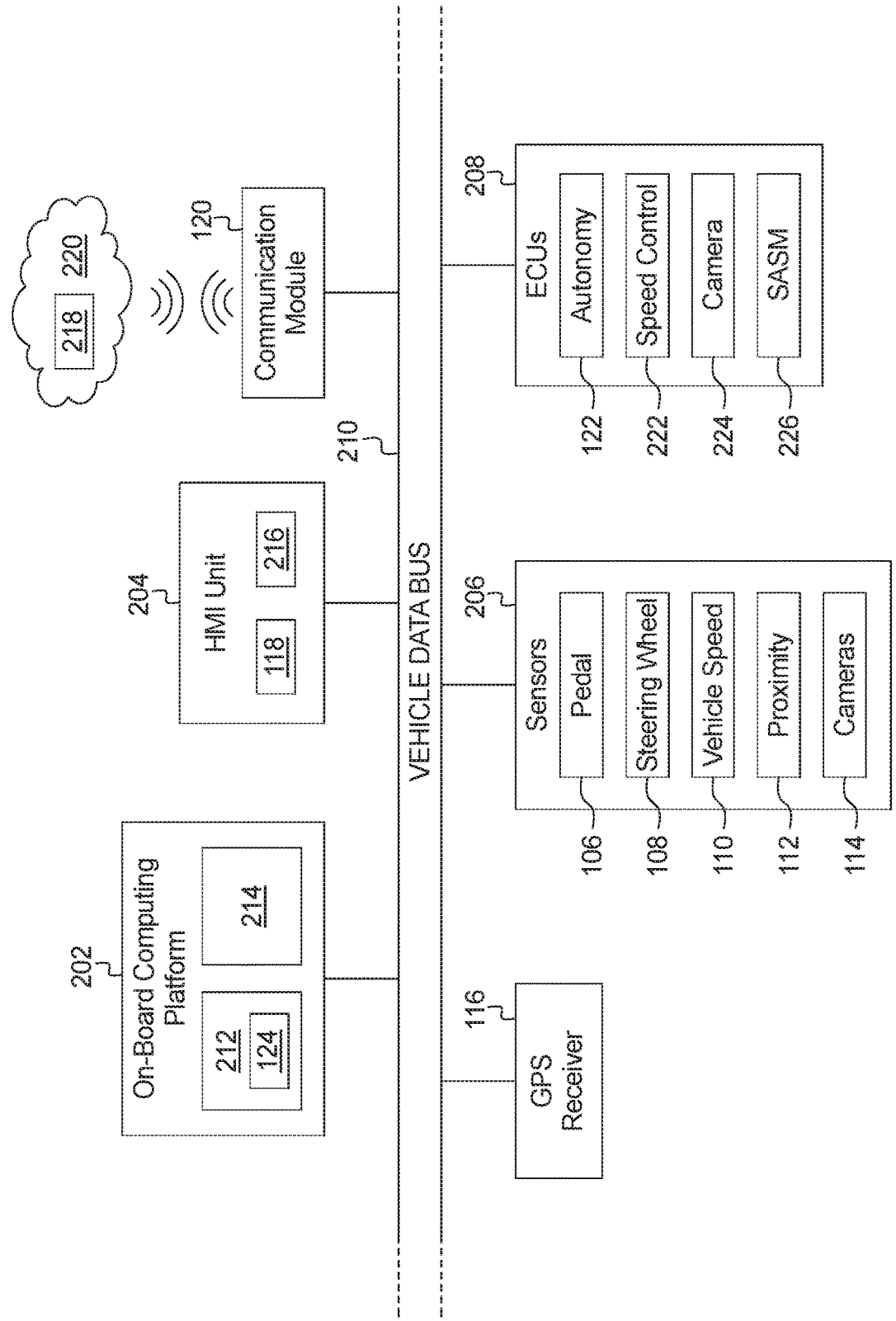
FIG. 2 is a block diagram of electronic components of the vehicle of FIG. 1.

FIG. 2 is a block diagram of electronic components 200 of the vehicle 100. As illustrated in FIG. 2, the electronic components 200 include an on-board computing platform 202, a human-machine interface (HMI) unit 204, the communication module 120, the GPS receiver 116, sensors 206, electronic control units (ECUs) 208, and a vehicle data bus 210.

The on-board computing platform 202 includes a processor 212 (also referred to as a microcontroller unit and a controller) and memory 214. In the illustrated example, the processor 212 of the on-board computing platform 202 is structured to include the park-assist controller 124. In other examples, the park-assist controller 124 is incorporated into one of the ECUs 208 with its own processor and memory. The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 214 includes multiple kinds of memory, particularly volatile memory and non-volatile memory.

The memory 214 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The HMI unit 204 provides an interface between the vehicle 100 and a user. The HMI unit 204 includes digital and/or analog interfaces (e.g., input devices and output devices) to receive input from and display information for the user(s). The input devices include, for example, a cabin microphone 216, other audio input device(s), a control knob, an instrument panel, a digital camera for image capture and/or visual command recognition, a touchscreen (e.g. the display 118), button(s), a touchpad, etc. The output devices may include the display 118, instrument cluster outputs (e.g., dials, lighting devices), actuators, speakers, etc. In the illustrated example, the HMI unit 204 includes hardware (e.g., a processor or controller, memory, storage, etc.) and software (e.g., an operating system, etc.) for an infotainment system (such as SYNC® and MyFord Touch® by Ford®). Additionally, the HMI unit 204 displays the infotainment system on, for example, the display 118.

The communication module 120 of the illustrated example is configured to communicate with a remote server 218 of an external network 220. For example, the external network 220 is a public network, such as the Internet; a private network, such as an intranet; or combinations thereof. Further, in some examples, the external network 220 utilizes a variety of networking protocols now available or later developed including, but not limited to, TCP/IP-based networking protocols.

The sensors 206 are arranged in and/or around the vehicle 100 to monitor properties of the vehicle 100 and/or an environment in which the vehicle 100 is located. One or more of the sensors 206 may be mounted to measure properties around an exterior of the vehicle 100. Additionally or alternatively, one or more of the sensors 206 may be mounted inside a cabin of the vehicle 100 or in a body of the vehicle 100 (e.g., an engine compartment, wheel wells, etc.) to measure properties in an interior of the vehicle 100. For example, the sensors 206 include accelerometers, odometers, tachometers, pitch and yaw sensors, wheel speed sensors, tire pressure sensors, biometric sensors and/or sensors of any other suitable type. In the illustrated example, the sensors 206 include the acceleration pedal sensor 108, the steering wheel angle sensor 106, the vehicle speed sensor 110, the proximity sensors 112, and the cameras 114.

The ECUs 208 monitor and control the subsystems of the vehicle 100. For example, the ECUs 208 are discrete sets of electronics that include their own circuit(s) (e.g., integrated circuits, microprocessors, memory, storage, etc.) and firmware, sensors, actuators, and/or mounting hardware. The ECUs 208 communicate and exchange information via a vehicle data bus (e.g., the vehicle data bus 210). Additionally, the ECUs 208 may communicate properties (e.g., status of the ECUs 208, sensor readings, control state, error and diagnostic codes, etc.) to and/or receive requests from each other. For example, the vehicle 100 may have dozens of the ECUs 208 that are positioned in various locations around the vehicle 100 and are communicatively coupled by the vehicle data bus 210.

In the illustrated example, the ECUs 208 include the autonomy unit 122, a speed control unit 222, a camera module 224, and a steering angle sensor module 226. For example, the autonomy unit 122 is configured to control performance of autonomous and/or semi-autonomous driving maneuvers of the vehicle 100. The speed control unit 222 is configured to monitor and/or control a speed at which the vehicle 100 travels. The camera module 224 controls one or more cameras 114 to collect image(s) and/or video, for example, that are presented to occupant(s) of the vehicle 100 via the display 118 and/or analyzed to control performance of autonomous and/or semi-autonomous driving maneuvers of the vehicle 100. Further, the steering angle sensor module 226 includes and/or is communicatively coupled to the steering wheel angle sensor 106 to monitor a steering angle of the steering wheel 102.

The vehicle data bus 210 communicatively couples the GPS receiver 116, the communication module 120, the on-board computing platform 202, the HMI unit 204, the sensors 206, and the ECUs 208. In some examples, the vehicle data bus 210 includes one or more data buses. The vehicle data bus 210 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
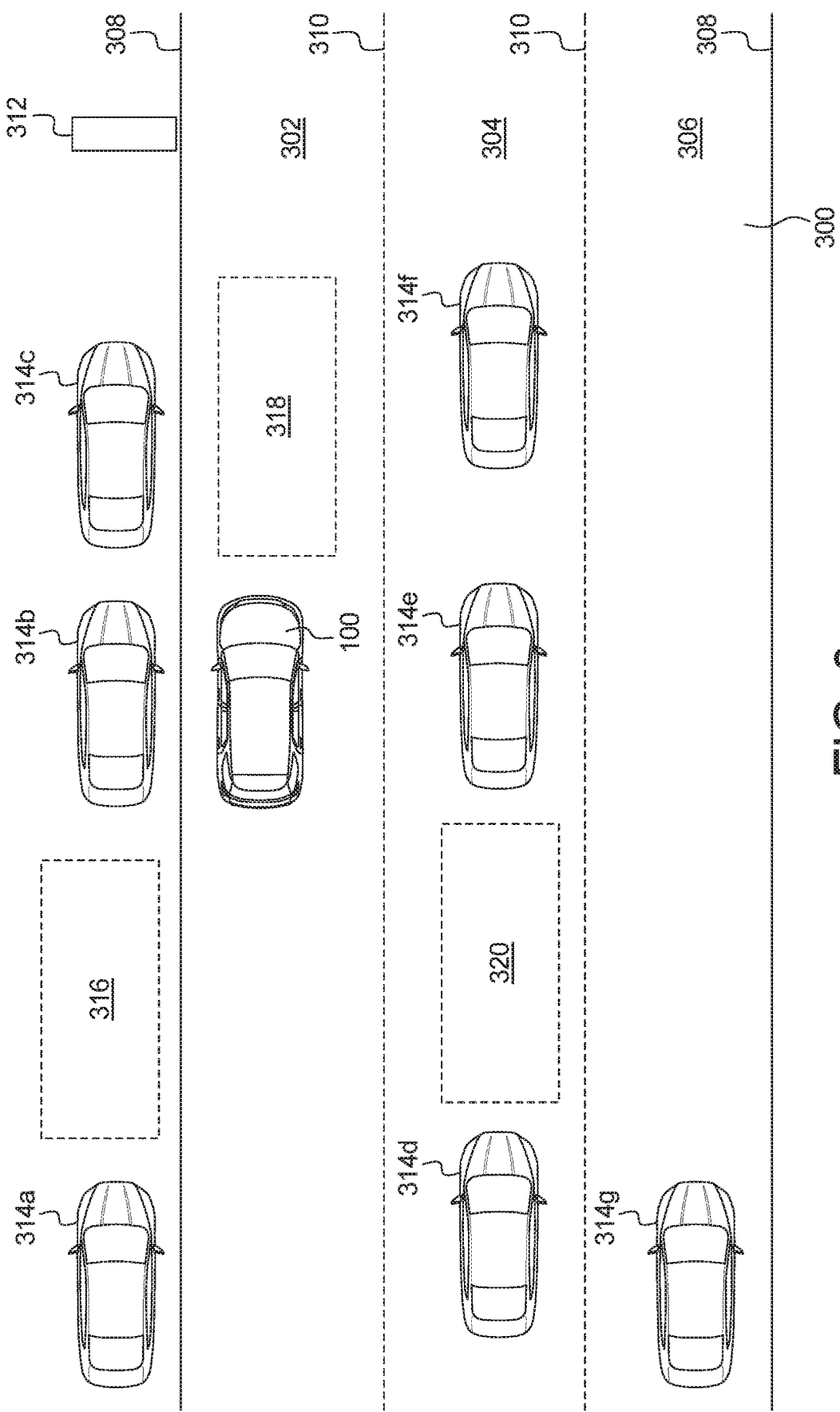
FIG. 3 depicts an example scenario for a park-assist system of the vehicle of FIG. 1.

FIG. 3 depicts an example scenario for a park-assist system of the vehicle 100. In the illustrated example, the vehicle 100 is travelling along a road 300. The road 300 is a multi-lane road that includes a plurality of lanes designated for a same direction-of-travel. For example, the road 300 includes a lane 302 (e.g., an outer lane), a lane 304 (e.g., an inner lane), and a lane 306 (e.g., an outer lane) that are each designated for the same direction-of-travel. As illustrated in FIG. 3, the road 300 includes (1) outer lines 308 (e.g., solid lines) that define the outer limits of the road and (2) inner lines 310 (e.g., dashed lines) that separate the lanes 302, 304, 306 from each other.

In FIG. 3, the vehicle 100 is approaching a sign 312 located along the side of the road 300. For example, the sign 312 identifies that the vehicle 100 is within and/or is approaching a construction zone. Further, the vehicle 100 is proximate to a plurality of other vehicles 314 positioned on and/or along the road 300. For example, a vehicle 314a, a vehicle 314b, and a vehicle 316c are parked (e.g., parallel parked) along a side of the road 300 adjacent to the vehicle 100. The vehicle 100 is travelling within the lane 302 of the road 300. A vehicle 314d, a vehicle 314e, and a vehicle 314f are travelling within the lane 304 adjacent to the vehicle 100. Further, the vehicle 314g is travelling within the lane 306 of the road 300.

The park-assist controller 124 of the vehicle 100 determines whether to suppress identification of potential parking spot(s) based on collected vehicle data and/or environmental data. In the illustrated example, the park-assist controller 124 of the vehicle 100 determines whether to suppress identification of a potential spot 316 (e.g., a potential parallel spot to the left of the vehicle 100), a potential spot 318 (e.g., a potential perpendicular spot in front of the vehicle 100), and/or a potential spot 320 (e.g., a potential perpendicular spot to the right of the vehicle 100).

In the illustrated example, the park-assist controller 124 is configured to determine whether to suppress identification of potential parking spot(s) based on an acceleration of the vehicle 100. For example, the park-assist controller 124 determines whether the vehicle 100 is accelerating via an acceleration sensor, such as the acceleration pedal sensor 108, the vehicle speed sensor 110, the proximity sensors 112, and/or the cameras 114. In response to the park-assist controller 124 determining that the vehicle 100 is accelerating, the park-assist controller 124 suppresses identification of potential parking spot(s) near the vehicle 100. In some examples, in response to the park-assist controller 124 determining that the vehicle 100 is not accelerating (e.g., is decelerating or is travelling at a constant speed), the park-assist controller 124 enables identification potential parking spot(s) (e.g., the potential spot 316). For example, the park-assist controller 124 enables identification of potential parking spot(s) 100 via the range-detection sensors (e.g., the proximity sensors 112, the cameras 114) of the vehicle 100.

Further, the park-assist controller 124 of the vehicle 100 is configured to determine whether to suppress identification of potential parking spot(s) based on an acceleration of the vehicle 100 relative to one or more of the other vehicles 314 that are travelling on the road 300 with the vehicle 100. In the illustrated example, the park-assist controller 124 suppresses identification of potential parking spot(s) near the vehicle 100 in response to detecting that the vehicle 100 is passing or being passed by one or more of the other vehicles 314 on the road 300. For example, the park-assist controller 124 determines, via the range-detection sensors, whether the vehicle 100 is passing and/or is being passed by one or more of the other vehicles 314 on the road 300. In some examples, in response to detecting that the that the vehicle 100 is passing or being passed by one or more of the other vehicles 314 on the road 300, the park-assist controller 124 enables identification of potential parking spot(s) via the range-detection sensors.

In some examples, the park-assist controller 124 of the vehicle 100 is configured to determine whether to suppress identification of potential parking spot(s) based on a vehicle location. For example, the park-assist controller 124 suppresses identification of potential parking spot(s) when the vehicle 100 is at a location at which no parking spots are available. The park-assist controller 124 is configured to suppress identification of potential parking spot(s) upon determining that the vehicle 100 is in a construction zone, a settlement area, and/or any other location at which parking spots are unavailable. In some examples, the park-assist controller 124 determines that the vehicle 100 is in an area in which parking spots are unavailable based on the range-detection sensors. For example, the park-assist controller 124 utilizes image-recognition software to detect that the vehicle 100 is within and/or approaching a construction zone based on image(s) and/or video of the sign 312 that are captured by one or more of the cameras 114. Further, in some examples, the park-assist controller 124 is configured to determine the vehicle 100 is in an area in which parking spots are unavailable based on parking information for the location of the vehicle 100. For example, the park-assist controller 124 is configured to (1) identify the vehicle location via the GPS receiver 116 and (2) retrieve parking information for the vehicle location from a remote server (e.g., the remote server 218) via the communication module 120.

Further, the park-assist controller 124 of the vehicle 100 of the illustrated example is configured to override suppression of the identification of the potential parking spots based on a vehicle location. For example, the park-assist controller 124 overrides suppressing the identification of the potential parking spots in response to determining that the current vehicle location corresponds with a parking lot (e.g., a permanent parking lot such as a parking structure, a temporary parking lot such as a field). In some examples, the park-assist controller 124 is configured to determine that the vehicle 100 is located in a parking lot based on information collected via the range-detection sensors and/or the GPS receiver 116. Further, the park-assist controller 124 is configured to determine that the vehicle 100 is located in a parking lot by monitoring a current driving pattern of the vehicle 100. For example, the park-assist controller 124 determines that the vehicle 100 is in a parking lot upon detecting a series of driving maneuvers (e.g., quick turns, short forward motions) associated with a vehicle driving through a parking lot.

Additionally or alternatively, the park-assist controller 124 of the vehicle 100 is configured to determine whether to suppress identification of potential parking spot(s) based on a location of the vehicle 100 within the road 300. For example, the park-assist controller 124 is configured to suppress identification of a potential parking spot in front of the vehicle 100, such as the potential spot 318, in response to detecting that the vehicle 100 is travelling in a lane (e.g., the lane 302) of the road 300. When the vehicle 100 is travelling in one of a plurality of lanes of a road designated for a same direction-of-travel, the park-assist controller 124 suppresses identification of parallel parking spots along a side of the vehicle 100 while detecting (e.g., via the range-detection sensors) that one or more other lanes of the road is on that side of the vehicle 100. For example, when the vehicle 100 is travelling in the lane 302 of the road 300, the park-assist controller 124 suppresses identification of parallel parking spots to the right of the vehicle 100 such as the potential spot 320. In some examples, park-assist controller 124 enables identification of parallel parking spots along a side of the vehicle 100 while detecting (e.g., via the range-detection sensors) that no other lane of the road is on that side of the vehicle 100. For example, when the vehicle 100 is travelling in the lane 302 of the road 300, the park-assist controller 124 enables identification of parallel parking spots to the left of the vehicle 100 such as the potential spot 316. That is, in some examples, the park-assist controller 124 enables identification of potential parking spots in some direction(s) (e.g., to the left) and suppresses identification of potential parking spots in other direction(s) (e.g., to the right, in the front).

Further, in some examples, the park-assist controller 124 (1) suppresses identification of potential parking spot(s) when one or more of a plurality of conditions is not met and (2) enables identification of potential parking spot(s) when each of the plurality of conditions is met. For example, the park-assist controller 124 is configured to suppress identification when the vehicle 100 is (1) accelerating, (2) passing another vehicle, (3) being passed by another vehicle, (4) in a construction zone, (5) in a settlement area, and/or (6) in a middle lane. In such examples the park-assist controller 124 is configured to enable identification when the vehicle 100 is not (1) accelerating, (2) passing another vehicle, (3) being passed by another vehicle, (4) in a construction zone, (5) in a settlement area, and (6) in a middle lane.

Figure 4:
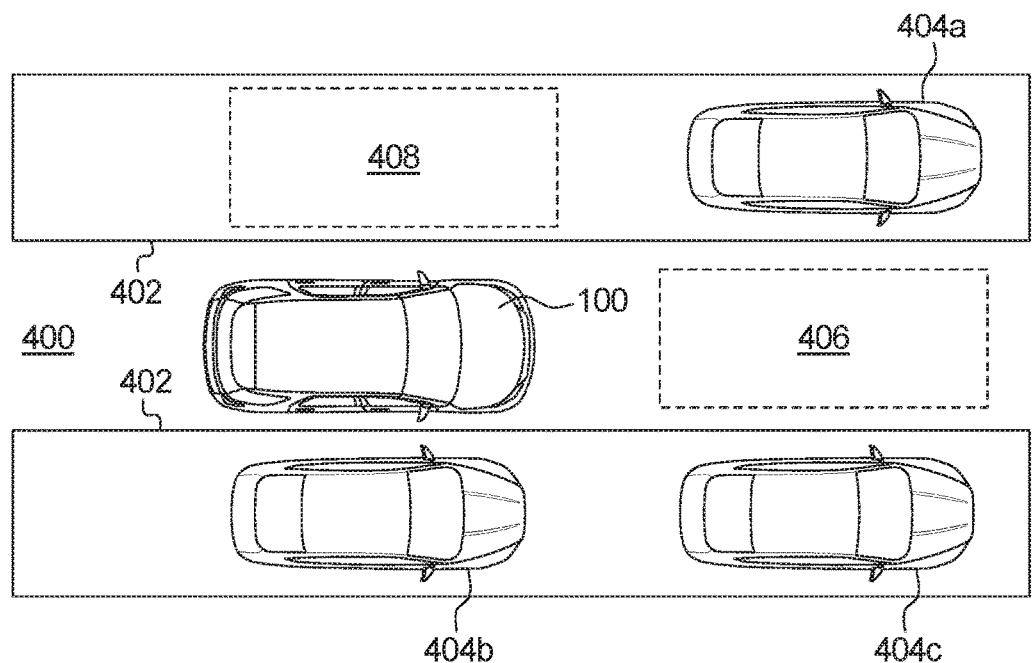
FIG. 4 depicts another example scenario for a park-assist system of the vehicle of FIG. 1.

FIG. 4 depicts another example scenario for the park-assist system of the vehicle 100. In the illustrated example, the vehicle 100 is travelling along a road 400. As illustrated in FIG. 4, the road 400 is a single-lane road that includes lines 402 (e.g., solid lines) to define the outer limits of the road 400. Further, in the illustrated example, the vehicle 100 is proximate to a plurality of other vehicles 404 parked along sides of the road 400. For example, a vehicle 404a is parked along a left side of the road 400, and a vehicle 404b and a vehicle 404c are parked along a right side of the road 400.

In the illustrated example, the park-assist controller 124 of the vehicle 100 is configured to determine whether to suppress identification of potential parking spot(s) based on a location of the vehicle 100 relative to the road 400. For example, upon detecting (e.g., via the range-detection sensors and/or the GPS receiver 116) that the vehicle 100 is located on the road 400, the park-assist controller suppresses identification of a potential spot 406 in front of the vehicle 100. That is, the park-assist controller 124 is configured to suppress identification of potential parking spot(s) that are located on the road 400. Additionally or alternatively, to prevent identification of potential parking spot(s) located on the road 400, the park-assist controller 124 is configured to suppress identification of potential perpendicular parking spot(s) (e.g., the potential spot 406) for remote park-assist that is in front of the vehicle 100 and/or when the vehicle 100 is located in the road. Further, in the illustrated example, the park-assist controller 124 enables identification of a potential spot 408 that is located along a side of the road 400 (e.g., to the left of the vehicle 100).

Figure 5:
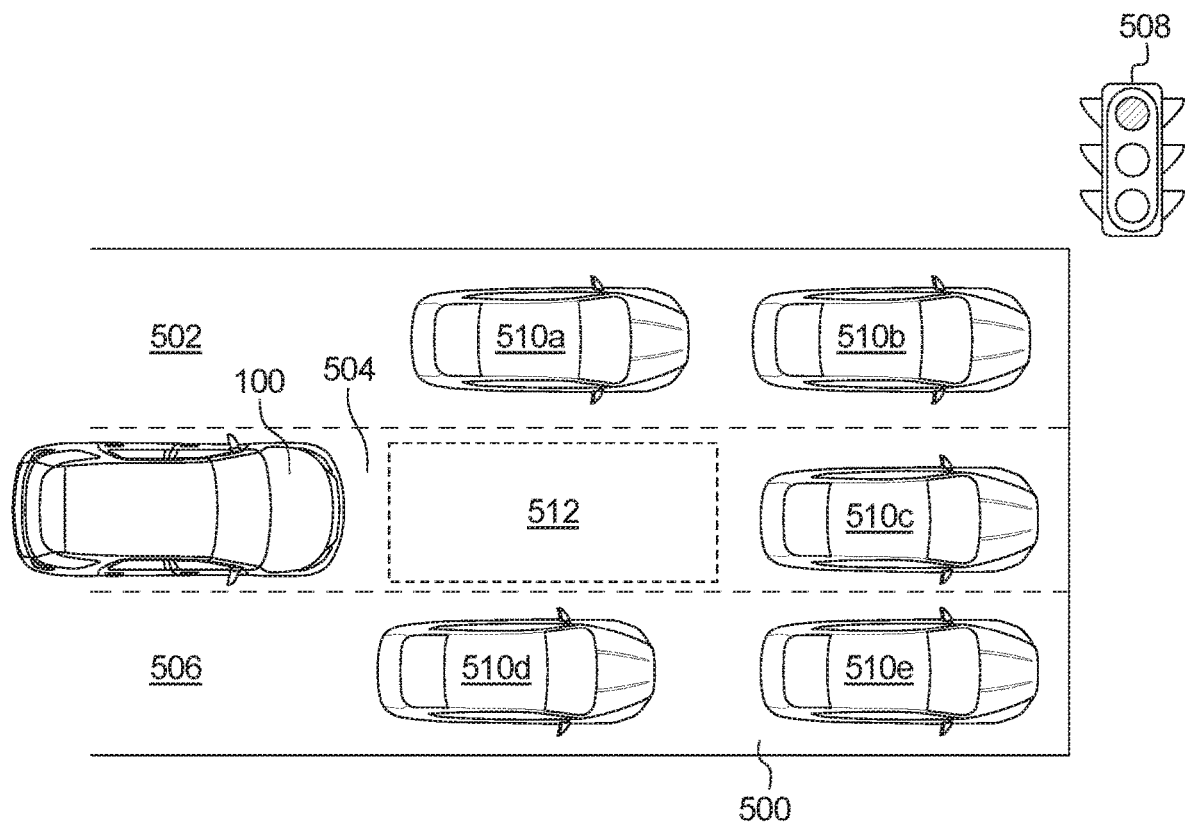
FIG. 5 depicts another example scenario for a park-assist system of the vehicle of FIG. 1.

FIG. 5 depicts another example scenario for the park-assist system of the vehicle 100. In the illustrated example, the vehicle 100 is travelling along a road 500. The road 500 is a multi-lane road that includes a plurality of lanes designated for a same direction-of-travel. For example, the road 500 includes a lane 502 (e.g., an outer lane), a lane 504 (e.g., an inner lane), and a lane 506 (e.g., an outer lane) that are each designated for the same direction-of-travel. As illustrated in FIG. 5, the road 500 is approaching an intersection with a traffic light 508. Further, the vehicle 100 is proximate to a plurality of other vehicles 510 positioned on the road 500. For example, a vehicle 510a and a vehicle 510b are located within the lane 502, a vehicle 510c is located within the lane 504, and a vehicle 510d and a vehicle 510e are located within the lane 506. The other vehicles 510 are stopped at the intersection based on a status of the traffic light 508 (e.g., a red light is illuminated). The vehicle 100 is approaching the other vehicles 510 that are in the road 500 and stopped at the intersection.

In the illustrated example, the park-assist controller 124 of the vehicle 100 is configured to determine whether to suppress identification of potential parking spot(s) based on a location of the vehicle 100 relative to the road 500 and/or the other vehicles 510. For example, upon detecting (e.g., via the range-detection sensors and/or the GPS receiver 116) that the vehicle 100 is located in the lane 504 of the road 500, the park-assist controller suppresses identification of a potential spot 512 that is in front of the vehicle 100 and between the other vehicles 510. That is, the park-assist controller 124 is configured to suppress identification of potential parking spot(s) located on the road 500.

Figure 6:
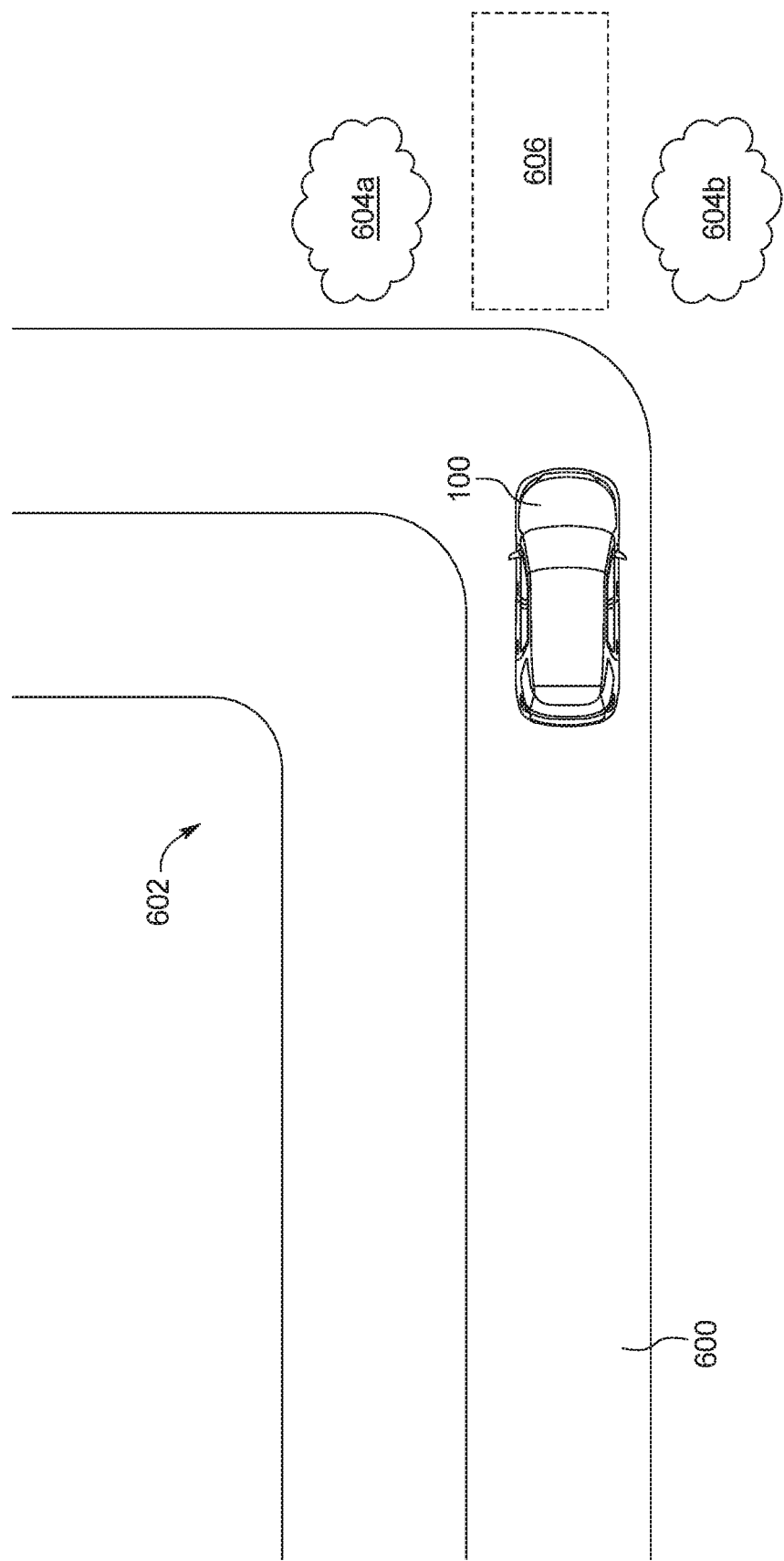
FIG. 6 depicts another example scenario for a park-assist system of the vehicle of FIG. 1.

FIG. 6 depicts another example scenario for the park-assist system of the vehicle 100. In the illustrated example, the vehicle 100 is travelling along a road 600. Further, the vehicle 100 is approaching a turn or bend 602 in the road 600. Objects 604 (e.g., trees, bushes, rocks, road barriers, signs, support posts, etc.) are located to a side of the bend 602 of the road 600 such that the objects 604 are in front of the vehicle 100 as the vehicle 100 approaches the bend. In the illustrated example, an object 604a and an object 604b are positioned such that there is a gap between the object 604a and the object 604b that corresponds with a size of a potential spot 606 (e.g., a potential perpendicular parking spot). Further, the object 604a and the object 604b are located relative to the bend 602 in the road 600 such that the potential spot 606 is in front of the vehicle 100 as the vehicle 100 approaches the bend 602.

The park-assist controller 124 of the vehicle 100 of the illustrated example is configured to determine whether to suppress identification of a potential perpendicular parking spot (e.g., the potential spot 606) in front of the vehicle 100 based on a steering path of the vehicle 100. For example, the park-assist controller 124 of the vehicle 100 is configured to determine whether to suppress identification of a potential perpendicular parking spot in front of the vehicle 100 based on an angle of the steering wheel 102 that is detected via the steering wheel angle sensor 106. In the illustrated example, the park-assist controller 124 of the vehicle 100 suppresses identification of the potential spot 606 in response to determining, via the steering wheel angle sensor 106 and/or the range-detection sensors, that the vehicle 100 is turning away from the potential spot 606.

In the illustrated example, the park-assist controller 124 of the vehicle 100 determines whether to suppress identification of a potential perpendicular parking spot (e.g., the potential spot 606) based on the steering wheel angle sensor 106 upon detecting (e.g., via the range-detection sensors and/or the GPS receiver 116) that the vehicle 100 is approaching a bend in a road (e.g., the bend 602 in the road 600). Additionally or alternatively, the park-assist controller 124 determines whether to suppress identification of a potential perpendicular parking spot based on the steering wheel angle sensor 106 upon detecting other characteristics of the surrounding area. For example, the park-assist controller 124 determines whether to suppress identification of a potential perpendicular parking spot based on the steering wheel angle sensor 106 upon detecting that the vehicle 100 is in a parking lot.

Figure 7B:
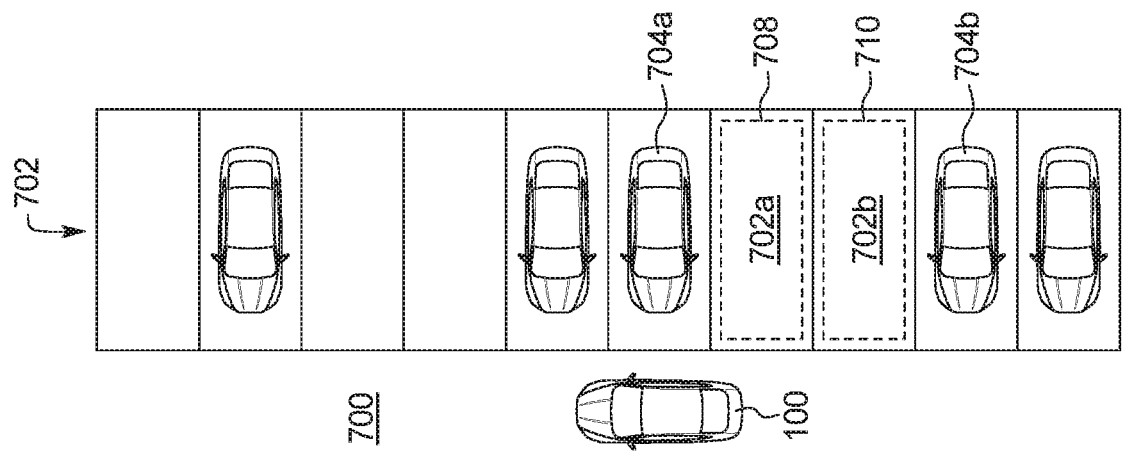
FIGS. 7A-7B depict another example scenario for a park-assist system of the vehicle of FIG. 1.
Figure 7A:
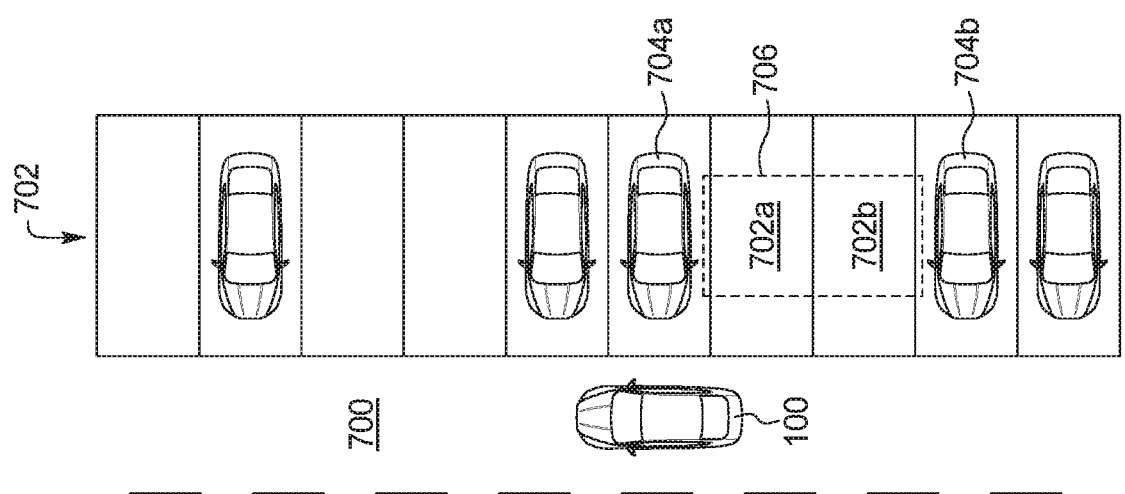

FIGS. 7A-7B depict another example scenario for the park-assist system of the vehicle 100. More specifically, FIG. 7A depicts when the park-assist controller 124 of the vehicle 100 has incorrectly identified a potential parking spot, and FIG. 7B depicts when the park-assist controller 124 of the vehicle 100 has correctly identified potential parking spots.

In the illustrated example, the vehicle 100 is travelling along a road 700. Parking spots 702 (e.g., perpendicular parking spots) are located along a side of the road 700. Other vehicles 704 are located in some of the parking spots 702. Others of the parking spots 702 are unoccupied. For example, a parking spot 702a and a parking spot 702b are unoccupied. Further, the parking spot 702a and the parking spot 702b are located next to each other between a vehicle 704a and a vehicle 704b. As illustrated in FIGS. 7A-7B, the vehicle 100 is located near the parking spot 702a and the parking spot 702b that are unoccupied.

In operation, the park-assist controller 124 of the vehicle 100 is configured to identify a potential parking spot via the range-detection sensors (e.g., the proximity sensors 112, the cameras 114) of the vehicle 100. For example, in FIG. 7A, the park-assist controller 124 identifies a potential parking spot 706, via the range-detection sensors, based on a distance between the vehicle 704a and the vehicle 704b. Further, the park-assist controller 124 presents an interface to an operator (e.g., a driver) of the vehicle 100 that depicts the potential parking spot 706. For example, the park-assist controller 124 presents an interface to the operator via the display 118 of the vehicle 100. The interface presented to the operator includes a representation of the potential parking spot 706 relative to the location of the vehicle 100 and/or other nearby objects such as the vehicles 704a, 704b.

Further, the park-assist controller 124 of the vehicle 100 of the illustrated example is configured to receive a confirmation or a correction of the potential parking spot 706 from the operator. For example, the operator is to review the interface presented via the display 118 to determine whether the park-assist controller 124 has correctly identified a potential parking spot. That is, the operator reviews the interface presented via the display 118 to determine whether the potential parking spot 706 corresponds with one of the parking spot 702. After determining whether the potential parking spot 706 is correct or incorrect, the operator is to provide feedback to the park-assist controller 124. That is, the park-assist controller 124 is configured to receive a confirmation and/or a correction of the potential parking spot 706 from the operator via the HMI unit 204. A correction identifies that a potential parking spot does not correspond with an actual parking spot. In some examples, the correction provided by the operator includes a repositioning and/or reorientation of a potential parking spot such that potential parking spot corresponds with an actual parking spot. Further, in some examples, a touchscreen (e.g., the display 118) of the HMI unit 204 is configured to receive a tactile selection from the operator and/or the cabin microphone 216 of the HMI unit 204 is configured to receive an audio selection from the operator.

In FIG. 7A, the potential parking spot 706 identified by the park-assist controller 124 is incorrect. In response to receiving a correction from the operator of the vehicle 100, the park-assist controller 124 is configured to determine whether the correction corresponds with another potential parking spot. For example, if the correction includes a repositioning and/or reorientation of the potential parking spot 706, the park-assist controller 124 determines whether the adjustment of the potential parking spot 706 provided by the operator in the correction corresponds with another potential parking spot.

FIG. 7B illustrates the example park-assist scenario after the park-assist controller 124 has received the correction from the operator. As illustrated in FIG. 7B, the park-assist controller 124 has identified a potential parking spot 708 and a potential parking spot 710 based on the correction provided by the operator. Upon identifying the potential parking spots 708, 710, the park-assist controller 124 presents an interface to the operator that depicts the potential parking spots 708, 710. For example, the park-assist controller 124 presents an interface to the operator via the display 118 of the vehicle 100. The interface presented to the operator includes a representation of the potential parking spots 708, 710 relative to the location of the vehicle 100 and/or other nearby objects such as the vehicles 704a, 704b. Further, the park-assist controller 124 of the vehicle 100 is configured to receive a confirmation or a correction of the potential parking spot 708 and/or the potential parking spot 710 from the operator.

In FIG. 7B, the potential parking spot 708 matches, aligns with, and/or otherwise corresponds with the parking spot 702a. Further, the potential parking spot 710 matches, aligns with, and/or otherwise corresponds with the parking spot 702b. Upon receiving a confirmation from the operator, the park-assist controller 124 is configured to instruct the autonomy unit 122 to perform park-assist motive function(s) into one of the potential parking spots 708, 710 that align with a respective one of the parking spots 702a, 702b. That is, the autonomy unit 122 is configured to perform park-assist into a potential parking spot responsive to the park-assist controller 124 receiving a confirmation from the operator. Additionally or alternatively, the autonomy unit 122 is configured to perform park-assist into a potential parking spot responsive to the park-assist controller 124 determining that a correction received from the operator corresponds with another potential parking spot (e.g., the potential parking spot 708, the potential parking spot 710).

In the illustrated example, the park-assist controller 124 is configured to store identification of potential parking spot(s) (e.g., the potential parking spot 706, the potential parking spot 708, the potential parking spot 710) and/or their corresponding classification (e.g., correct, incorrect) in parking map to facilitate identification of potential parking spot(s) in the future. In some examples, the park-assist controller 124 stores the parking map onboard the vehicle 100 in the memory 214. Additionally or alternatively, the park-assist controller 124 stores the information remotely (e.g., at the remote server 218). For example, the park-assist controller 124 transmits the parking map to the remote server 218 via the communication module 120. In some examples, the park-assist controller 124 stores the parking map remotely to enable other vehicles to access the parking map to facilitate those vehicles in identifying potential parking spot(s) in the future.

Figure 8:
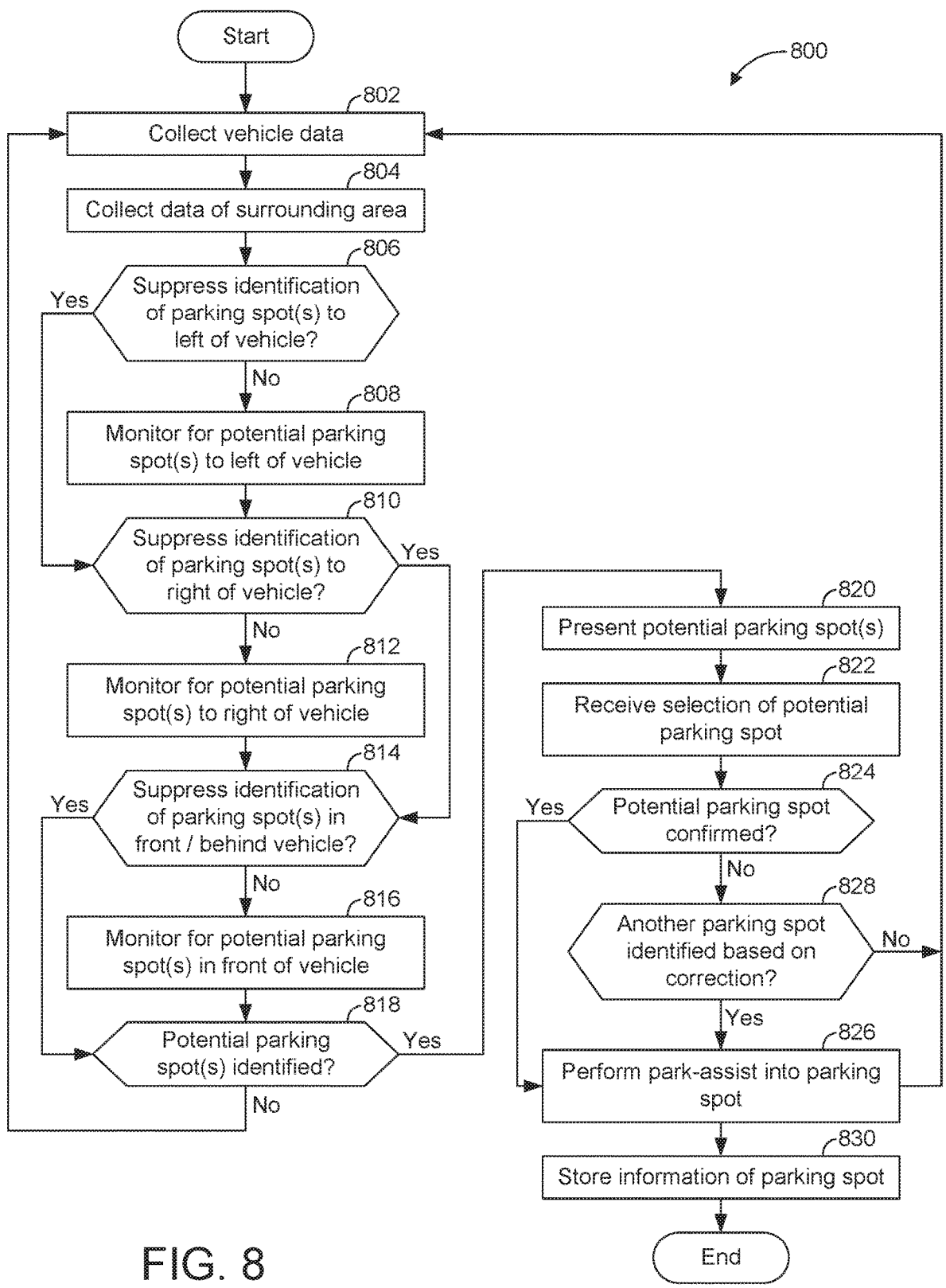
FIG. 8 is a flowchart for identifying parking spots for vehicle park-assist in accordance with the teachings herein.

FIG. 8 is a flowchart of an example method 800 to identify parking spots for vehicle park-assist. The flowchart of FIG. 8 is representative of machine readable instructions that are stored in memory (such as the memory 214 of FIG. 2) and include one or more programs which, when executed by a processor (such as the processor 212 of FIG. 2), cause the vehicle 100 to implement the example park-assist controller 124 of FIGS. 1 and 2. While the example program is described with reference to the flowchart illustrated in FIG. 8, many other methods of implementing the example park-assist controller 124 may alternatively be used. For example, the order of execution of the blocks may be rearranged, changed, eliminated, and/or combined to perform the method 800. Further, because the method 800 is disclosed in connection with the components of FIGS. 1-2, some functions of those components will not be described in detail below.

Initially, at block 802, the park-assist controller 124 collects vehicle data of the vehicle 100. For example, the park-assist controller 124 collects a speed (e.g., via the vehicle speed sensor 110), an acceleration (e.g., via the vehicle speed sensor 110, the acceleration pedal sensor 108), a location (e.g., via the GPS receiver 116), a direction-of-travel (e.g., via the GPS receiver 116), a turn angle (e.g., via the steering wheel angle sensor 106), a driving pattern, etc. of the vehicle 100. At block 804, the park-assist controller 124 collects data of a surrounding area of the vehicle 100. For example, the park-assist controller 124 collects proximity data (e.g., via the range-detection sensors) of nearby object(s) and/or location-classification information (e.g., via the range-detection sensors, the remote server 218). For example, the location-classification information identifies (i) on which road the vehicle 100 is travelling, (ii) how many lanes the road includes, (iii) in which lane of the road the vehicle 100 is travelling, (iv) a width of the lane, (v) whether the road is bending, (vi) whether the vehicle 100 is in a construction zone, (vii) whether the vehicle 100 is in a parking lot, (viii) whether the vehicle 100 is in a settlement area, etc.

At block 806, the park-assist controller 124 determines whether to suppress identification of potential parking spot(s) along the left side of the vehicle 100, for example, based on the collected vehicle data and/or data of the surrounding area. In response to the park-assist controller 124 determining to suppress the identification of potential parking spot(s) to the left of the vehicle 100, the method 800 proceeds to block 810. Otherwise, in response to the park-assist controller 124 determining not to suppress the identification of potential parking spot(s) to the left of the vehicle 100, the method 800 proceeds to block 808 at which the park-assist controller 124 monitors for potential parking spot(s) (e.g., parallel spots, perpendicular spots, angled spots) along the left side of the vehicle 100 (e.g., via the range-detection sensors).

At block 810, the park-assist controller 124 determines whether to suppress identification of potential parking spot(s) along the right side of the vehicle 100, for example, based on the collected vehicle data and/or data of the surrounding area. In response to the park-assist controller 124 determining to suppress the identification of potential parking spot(s) to the right of the vehicle 100, the method 800 proceeds to block 814. Otherwise, in response to the park-assist controller 124 determining not to suppress the identification of potential parking spot(s) to the right of the vehicle 100, the method 800 proceeds to block 812 at which the park-assist controller 124 monitors for potential parking spot(s) (e.g., parallel spots, perpendicular spots, angled spots) along the right side of the vehicle 100 (e.g., via the range-detection sensors).

At block 814, the park-assist controller 124 determines whether to suppress identification of potential parking spot(s) in front of and/or behind the vehicle 100, for example, based on the collected vehicle data and/or data of the surrounding area. In response to the park-assist controller 124 determining to suppress the identification of potential parking spot(s) in front of and/or behind the vehicle 100, the method 800 proceeds to block 818. Otherwise, in response to the park-assist controller 124 determining not to suppress the identification of potential parking spot(s) in front of and/or behind the vehicle 100, the method 800 proceeds to block 816 at which the park-assist controller 124 monitors for potential parking spot(s) (e.g., perpendicular spots, angled spots) in front of and/or behind the vehicle 100 (e.g., via the range-detection sensors).

At block 818, the park-assist controller 124 determines whether it has identified any potential parking spot(s) at blocks 808, 812, 816. In response to the park-assist controller 124 not identifying a potential parking spot, the method 800 returns to block 802. Otherwise, in response to the park-assist controller identifying potential parking spot(s), the method 800 proceeds to block 820.

At block 820, the park-assist controller 124 presents a representation of one or more of the potential parking spot(s) to an operator via the display 118 of the vehicle 100. At block 822, the HMI unit 204 of the vehicle 100 receives a selection from the operator of one of the potential parking spot(s). For example, the HMI unit 204 collects the selection from the operator as a tactile input (e.g., via a button, a dial, a touchscreen such as the display 118, etc.) and/or an audio input (e.g., via the cabin microphone 216, etc.).

At block 822, the park-assist controller 124 determines whether the potential parking spot has been confirmed or corrected by the operator. For example, the HMI unit 204 receives a confirmation input from the operator upon the operator confirming that the potential parking spot, as represented via the display 118, matches an actual parking spot viewed by the operator. The HMI unit 204 receives a correction input from the operator to inform the park-assist controller 124 that the potential parking spot, as represented via the display 118, does not match an actual parking spot viewed by the operator. In some examples, the correction input includes a readjustment of the potential parking spot such that the potential parking spot, as represented via the display 118, now matches an actual parking spot viewed by the operator.

In response to the park-assist controller 124 determining that the potential parking has been confirmed by the operator, the method 800 proceeds to block 826 at which the autonomy unit 122 performs park-assist motive functions to park the vehicle 100 in the identified parking spot. Otherwise, in response to the park-assist controller 124 determining that the potential parking has been corrected by the operator, the method 800 proceeds to block 828 at which the park-assist controller 124 determines whether it identifies another parking spot based on the correction. In response to the park-assist controller 124 not identifying another parking spot based on the correction, the method 800 returns to block 802. Otherwise, in response to the park-assist controller 124 identifying another parking spot based on the correction, the method 800 proceeds to block 826 at which the autonomy unit 122 parks the vehicle 100 in the identified parking spot. At block 830, the park-assist controller stores information of the identified parking spot in a parking map (e.g., in the memory 214 onboard the vehicle 100, in the remote server 218, etc.).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
range-detection sensors;
an acceleration sensor;
an autonomy unit to perform park-assist; and
a controller configured to:
determine, via the acceleration sensor, whether the vehicle is accelerating;
responsive to determining that the vehicle is not accelerating, identify potential parking spots for the park-assist via the range-detection sensors; and
responsive to detecting that the vehicle is accelerating, suppress identification of the potential parking spots,
wherein, when the vehicle is in one of a plurality of lanes designated for a same direction-of-travel, the controller is configured to suppress the identification of potential parallel parking spots along a side of the vehicle while detecting one or more of the plurality of lanes on the side of the vehicle.

2. The vehicle of claim 1, wherein the acceleration sensor includes a vehicle speed sensor.

3. The vehicle of claim 1, wherein the acceleration sensor includes an accelerator pedal position sensor.

4. The vehicle of claim 1, further including a display to present a representation of a parking spot identified by the controller.

5. The vehicle of claim 4, wherein the autonomy unit is to perform the park-assist to park the vehicle in the parking spot identified by the controller.

6. The vehicle of claim 1, wherein the controller is configured to suppress the identification of the potential parking spots responsive to determining, via the range-detection sensors, that the vehicle is passing or being passed by another vehicle.

7. The vehicle of claim 1, further including a GPS receiver to identify a vehicle location, wherein the controller is configured to determine whether to suppress the identification of the potential parking spots based on the vehicle location.

8. The vehicle of claim 7, further including a communication module to retrieve parking information for the vehicle location, wherein the controller is configured to determine whether to suppress the identification of the potential parking spots for the vehicle location based on the parking information.

9. The vehicle of claim 1, wherein the controller is configured to suppress the identification of a potential perpendicular parking spot in front of the vehicle responsive to detecting that the vehicle is located on a road.

10. The vehicle of claim 9, wherein the controller is configured to suppress the identification of the potential perpendicular parking spot for remote park-assist.

11. The vehicle of claim 1, further including a steering wheel angle sensor, wherein the controller is configured to suppress the identification of a potential perpendicular parking spot in front of the vehicle upon determining, via the steering wheel angle sensor and the range-detection sensors, that the vehicle is turning away from the potential perpendicular parking spot.

12. The vehicle of claim 11, wherein the controller is configured to suppress the identification of the potential perpendicular parking spot based on the steering wheel angle sensor in response to detecting that the vehicle is at least one of within a parking lot and approaching a bend in a road.

13. The vehicle of claim 1, wherein the controller is configured to override suppressing the identification of the potential parking spots responsive to determining that a current driving pattern of the vehicle corresponds with a parking lot.

14. A vehicle comprising:
range-detection sensors;
an acceleration sensor;
an autonomy unit to perform park-assist; and
a controller configured to:
determine, via the acceleration sensor, whether the vehicle is accelerating;
responsive to determining that the vehicle is not accelerating, identify potential parking spots for the park-assist via the range-detection sensors;
responsive to detecting that the vehicle is accelerating, suppress identification of the potential parking spots; and
responsive to detecting that the vehicle is located on a road, suppress the identification of a potential perpendicular parking spot in front of the vehicle.

15. A vehicle comprising:
range-detection sensors;
an acceleration sensor;
an autonomy unit to perform park-assist;
a steering wheel angle sensor; and
a controller configured to:
determine, via the acceleration sensor, whether the vehicle is accelerating;
responsive to determining that the vehicle is not accelerating, identify potential parking spots for the park-assist via the range-detection sensors;
responsive to detecting that the vehicle is accelerating, suppress identification of the potential parking spots; and
suppress the identification of a potential perpendicular parking spot in front of the vehicle upon determining, via the steering wheel angle sensor and the range-detection sensors, that the vehicle is turning away from the potential perpendicular parking spot.

16. A vehicle comprising:
range-detection sensors;
an acceleration sensor;
an autonomy unit to perform park-assist; and
a controller configured to:
determine, via the acceleration sensor, whether the vehicle is accelerating;

responsive to determining that the vehicle is not accelerating, identify potential parking spots for the park-assist via the range-detection sensors;

responsive to detecting that the vehicle is accelerating, suppress identification of the potential parking spots; and responsive to determining that a current driving pattern of the vehicle corresponds with a parking lot, override suppressing the identification of the potential parking spots.

* * * * *